United States Patent
Klug et al.

(10) Patent No.: US 10,395,063 B2
(45) Date of Patent: Aug. 27, 2019

(54) ZERO DETECTION CIRCUIT AND MASKED BOOLEAN OR CIRCUIT

(71) Applicant: Infineon Technologies AG, Neubiberg (DE)

(72) Inventors: Franz Klug, Aying (DE); Thomas Kuenemund, Munich (DE)

(73) Assignee: Infineon Technologies AG, Neubiberg (DE)

( * ) Notice: Subject to any disclaimer, the term of this patent is extended or adjusted under 35 U.S.C. 154(b) by 239 days.

(21) Appl. No.: 15/272,458

(22) Filed: Sep. 22, 2016

(65) Prior Publication Data
US 2017/0083723 A1   Mar. 23, 2017

(30) Foreign Application Priority Data
Sep. 23, 2015  (DE) .................. 10 2015 116 049

(51) Int. Cl.
| | | |
|---|---|---|
| H04L 29/06 | (2006.01) | |
| G06F 21/71 | (2013.01) | |
| G06F 7/00 | (2006.01) | |
| G06F 21/55 | (2013.01) | |
| G06F 21/62 | (2013.01) | |
| H04L 9/00 | (2006.01) | |
| H03K 5/1536 | (2006.01) | |
| H03K 5/22 | (2006.01) | |

(52) U.S. Cl.
CPC .............. *G06F 21/71* (2013.01); *G06F 7/00* (2013.01); *G06F 21/55* (2013.01); *G06F 21/62* (2013.01); *H03K 5/1536* (2013.01); *H03K 5/22* (2013.01); *H04L 9/00* (2013.01); *H04L 2209/04* (2013.01)

(58) Field of Classification Search
CPC .......... G06F 21/71; G06F 21/62; G06F 21/55; G06F 7/00; H03K 5/22; H03K 5/1536; H04L 9/00; H04L 2209/04
See application file for complete search history.

(56) References Cited

U.S. PATENT DOCUMENTS

| | | |
|---|---|---|
| 7,178,168 B2 | 2/2007 | Gammel et al. |
| 7,567,668 B2 | 7/2009 | Gammel et al. |

(Continued)

FOREIGN PATENT DOCUMENTS

| | | |
|---|---|---|
| DE | 10201450 B4 | 9/2004 |
| DE | 102006004557 A1 | 8/2006 |

(Continued)

*Primary Examiner* — Kendall Dolly
(74) *Attorney, Agent, or Firm* — Viering, Jentschura & Partner MBB

(57) ABSTRACT

A zero detection circuit includes a chain of masked OR circuits. Each masked OR circuit includes data inputs. Each data input is configured to receive a respective data input bit. Each masked OR circuit further includes an input mask input to receive one or more input masking bits, an output mask input to receive an output masking bit and a data output. The zero detection circuit is configured to output a bit equal to an OR combination, masked with the output masking bit, of the data input bits, each demasked with an input masking bit of the one or more input masking bits. One of the inputs of each masked OR circuit except the first masked OR circuit of the chain of masked OR circuits is coupled to the data output of the masked OR circuit preceding the masked OR circuit in the chain of masked OR circuits.

8 Claims, 12 Drawing Sheets

(56) References Cited

U.S. PATENT DOCUMENTS

2007/0188355 A1* 8/2007 Baek .................. H04L 9/003
                                                    341/51
2008/0292100 A1* 11/2008 Komano ............ H04L 9/003
                                                    380/29
2009/0112896 A1* 4/2009 Golic ................ G06F 7/764

FOREIGN PATENT DOCUMENTS

DE      602004013206 T2    5/2009
WO         2006058561 A1   6/2006

* cited by examiner

ZERO DETECTION CIRCUIT AND MASKED BOOLEAN OR CIRCUIT

CROSS-REFERENCE TO RELATED APPLICATION

This application claims priority to German Patent Application Serial No. 10 2015 116 049.8, which was filed Sep. 23, 2015, and is incorporated herein by reference in its entirety.

TECHNICAL FIELD

The present disclosure relates to zero detection circuits and masked Boolean OR circuits.

BACKGROUND

Probing or forcing attacks on integrated circuits (ICs) are considered as one of the most serious threats to security critical electronic devices such as chip cards since these attacks may be used by an attacker to acquire secret information. Accordingly, concepts and techniques that thwart this kind of attacks on integrated circuits are desirable.

SUMMARY

A zero detection circuit includes a chain of masked OR circuits. Each masked OR circuit includes data inputs. Each data input is configured to receive a respective data input bit. Each masked OR circuit further includes an input mask input to receive one or more input masking bits, an output mask input to receive an output masking bit and a data output. The zero detection circuit is configured to output a bit equal to an OR combination, masked with the output masking bit, of the data input bits, each demasked with an input masking bit of the one or more input masking bits. One of the inputs of each masked OR circuit except the first masked OR circuit of the chain of masked OR circuits is coupled to the data output of the masked OR circuit preceding the masked OR circuit in the chain of masked OR circuits.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Masking techniques may be used to hinder probing or forcing attacks of integrated circuits, specifically to protect endangered points (e.g. ALU buses, adders, multiplexers, shifters). In various embodiments, typically there are critical signal nodes in a security critical integrated circuit where critical information is compressed to one single bit. An example for such a compression point is a node where zero detection information is generated. In this case, for protection of the critical information, besides protecting the node, it is further necessary to protect the logic which performs the compression. This is typically an important issue and care has to be taken how to approach this for the following reasons:

the path is timing critical, because for example the masked output of an ALU (arithmetic logic unit) has to be taken and compressed. So additional logic has to be added into the already critical path, masked ALUs consume significantly more power, because even the most power efficient masking is typically realized with XOR (exclusive OR) operations. The additional hardware generates significantly more switching activities in the whole system (e.g. the whole IC). This may lead to a massive increase in power consumption and the whole data path (related to the critical information) must be protected in a proper way. Otherwise an attacker will still have attack points which will help him to extract the critical information.

Figure 1:
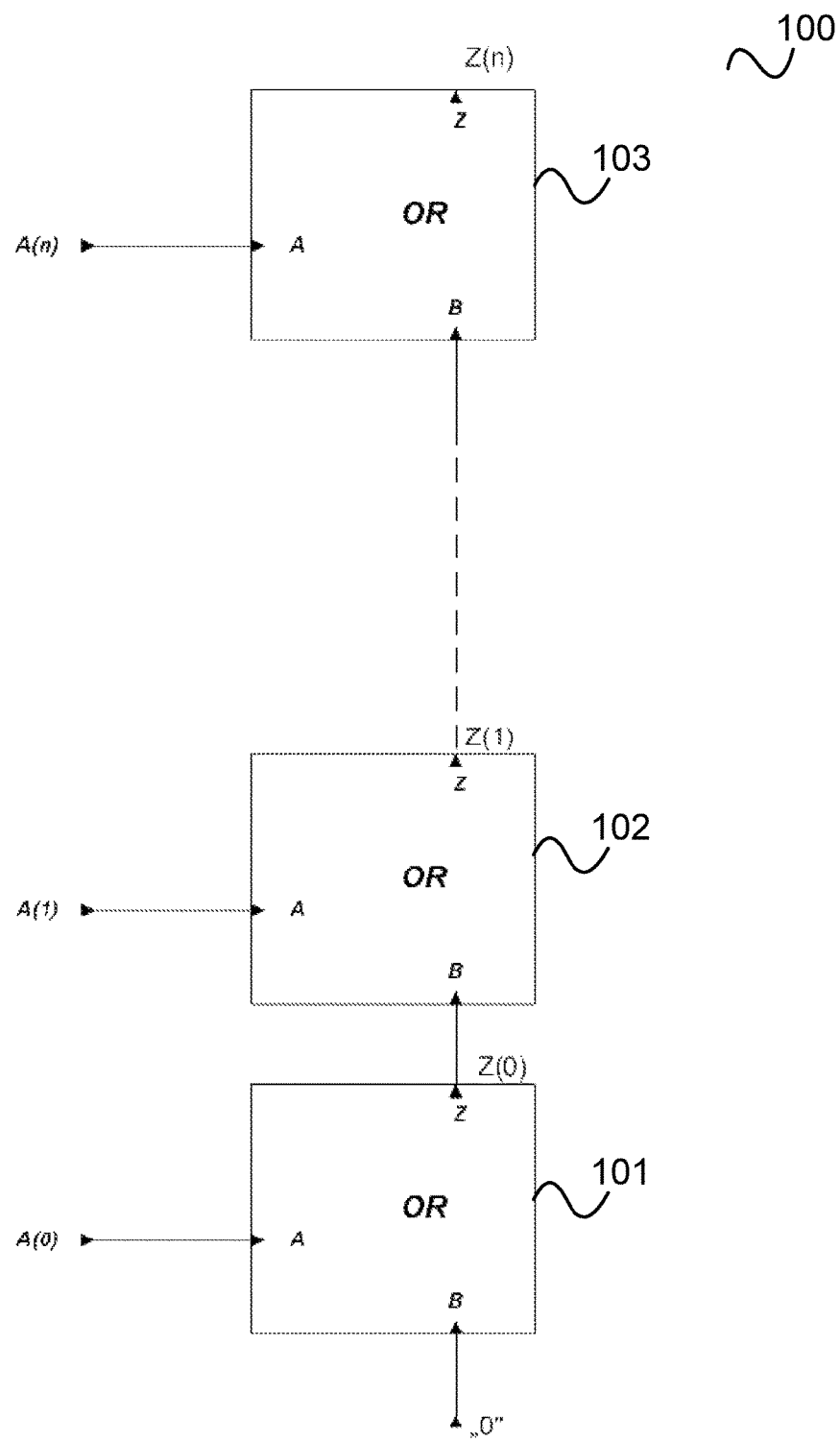
FIG. 1 shows an example of a zero detection circuit based on a plain OR-tree network.

FIG. 1 shows an example of a zero detection circuit 100 based on a plain OR-tree network.

The zero detection circuit 100 includes a chain of n+1 OR circuits 101, 102, 103, numbered from 0 to n, wherein each OR circuit 101, 102, 103 includes two inputs A and B and a data output Z where it outputs the OR combination of input signals supplied at its two inputs.

The zero detection circuit 100 identifies a zero value on an output bus A<n:0>, i.e. detects whether all bits of the n-bit word A(0) . . . A(n) on the output bus are equal to zero.

For this, the ith OR circuit receives A(i) at its A input and the output of the previous OR circuit Z(i−1) at its B input except for the first OR circuit 101 which receives 0 at its B input. The output of the nth OR circuit 103 Z(n) is the output of the zero detection circuit 100. A value of Z(n)=0 indicates that all bits of A(0) ... A(n) are equal to zero.

Typically, the output bus carries a processing result of an ALU. Due to the carry chain in an ALU, arithmetic bits of a result bus are typically generated sequentially if no performance requirements necessitate additional hardware. For such designs, an OR-tree zero detection logic matches perfectly from the performance, area and power point of view.

In the following, an embodiment is described which allows using masking circuit technology to efficiently protect a zero detection logic.

Figure 2:
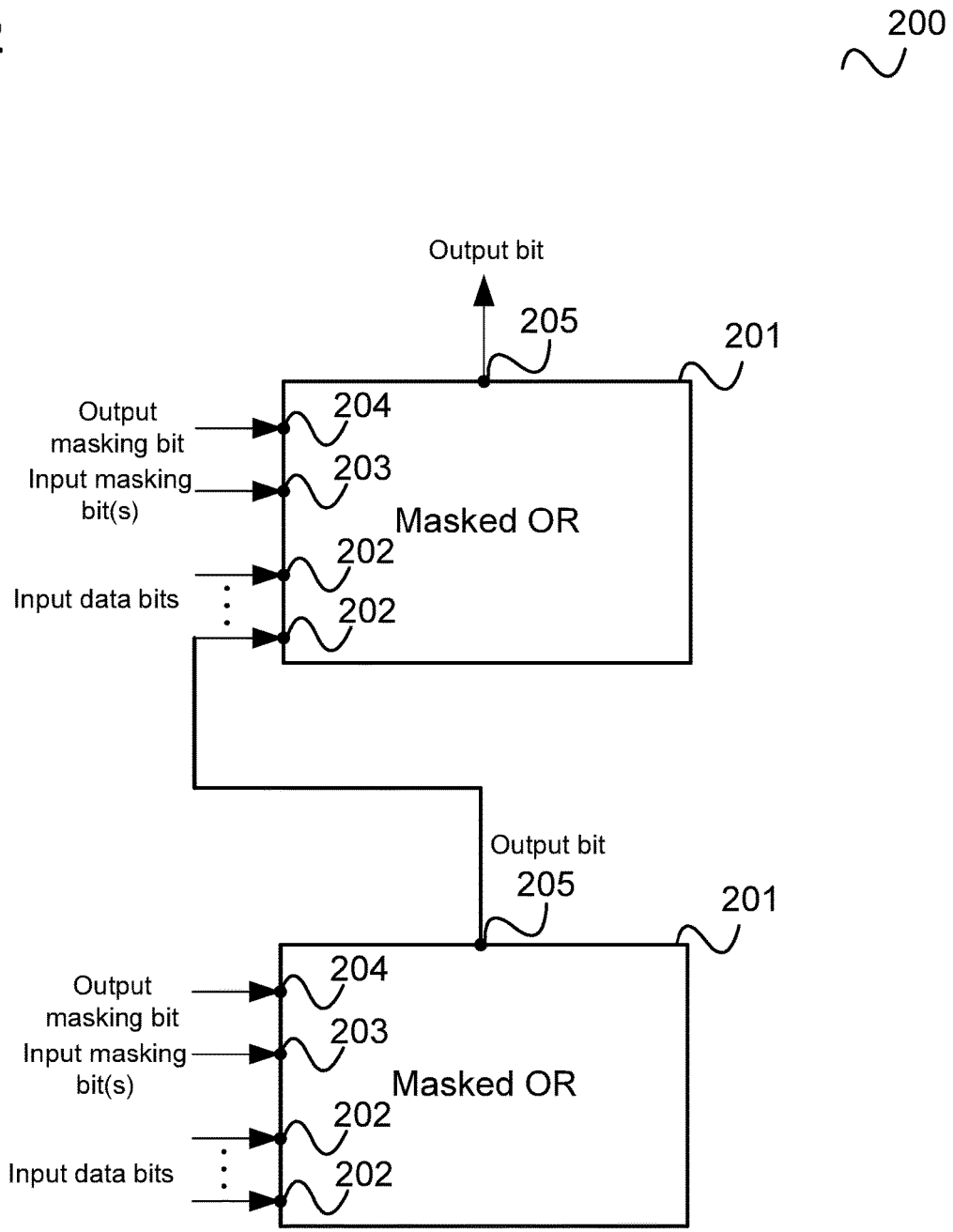
FIG. 2 shows a zero detection circuit according to an embodiment.

FIG. 2 shows a zero detection circuit 200.

The zero detection circuit 200 includes a chain of masked (Boolean) OR circuits 201, wherein each masked OR circuit 201 of the chain of masked OR circuits 201 includes a plurality of data inputs 202, wherein each data input is configured to receive a respective data input bit, at least one input mask input 203 configured to receive one or more input masking bits, at least one output mask input 204 configured to receive an output masking bit and a data output 205.

Each masked OR circuit 201 is configured to output a bit equal to an OR combination, masked with the output masking bit, of the data input bits, each demasked with an input masking bit of the one or more input masking bits.

Further, one of the inputs 202 of each masked OR circuit 201 except the first masked OR circuit of the chain of masked OR circuits is coupled to the data output 205 of the masked OR circuit preceding the masked OR circuit in the chain of masked OR circuits.

Figure 3:
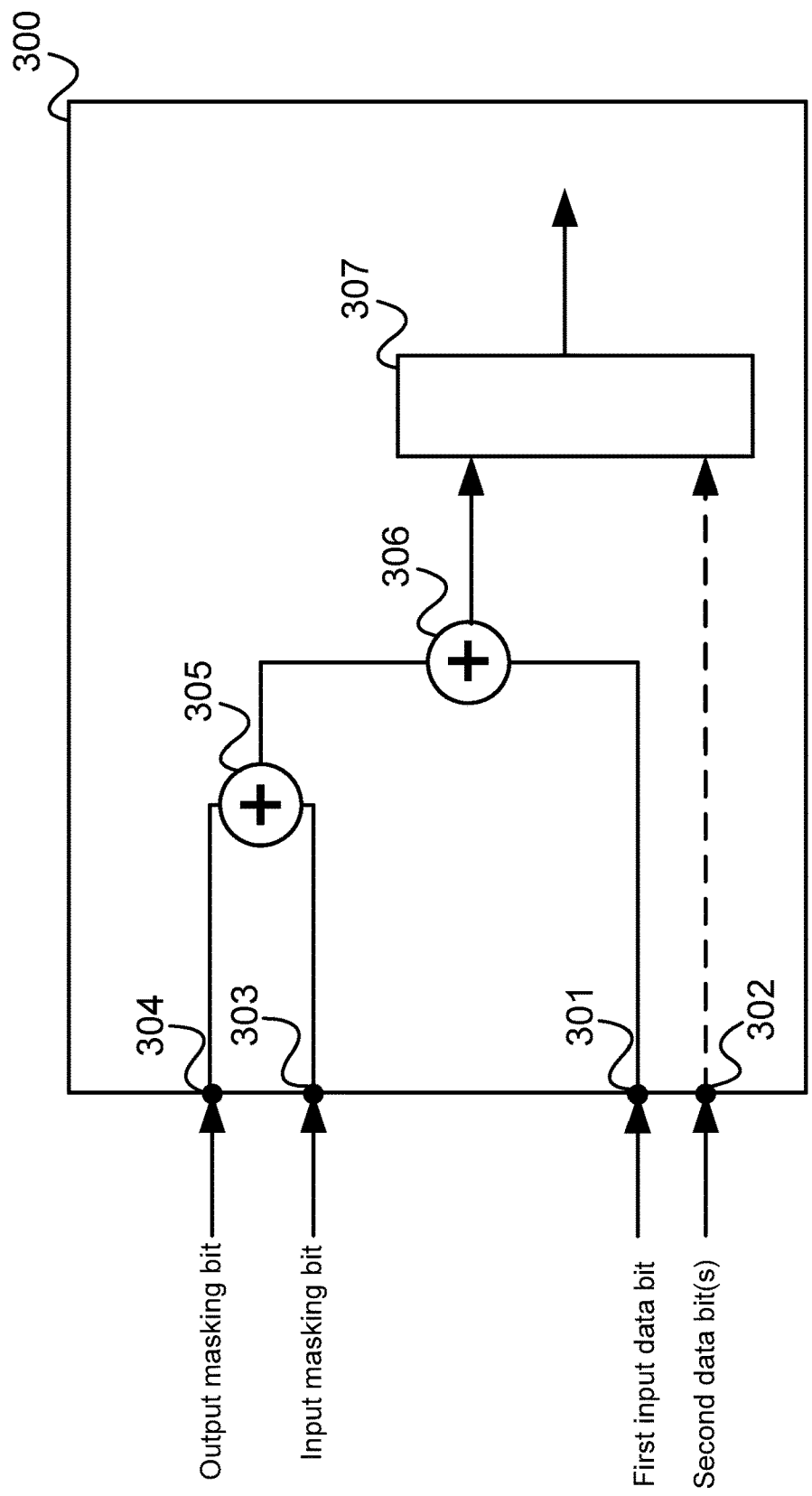
FIG. 3 shows a masked OR circuit according to an embodiment.

The masked OR circuits for example have a structure as illustrated in FIG. 3.

FIG. 3 shows a masked OR circuit 300.

The masked OR circuit 300 includes a first data input 301 configured to receive a first data input bit, one or more second data inputs 302 configured to receive one or more second data input bits, an input mask input 303 configured to receive an input masking bit and an output mask input 304 configured to receive an output masking bit.

The masked OR circuit 300 further includes a first adder-modulo-2 305 configured to add-modulo-2 the input masking bit and the output masking bit and a second adder-modulo-2 306 configured to add-modulo-2 the result of the first adder-modulo-2 305 to the first data input bit.

Further, the masked OR circuit 300 includes a combiner 307 configured to receive the result of the second adder-modulo-2 306 and one or more further bits depending on the one or more second data input bits and is configured to generate an output equal to an OR combination, masked with the output masking bit, of the result of the second adder-modulo-2 306, demasked with the output masking bit, and the one or more further bits, demasked with the output masking bit.

An adder-modulo-2 means an adder which adds two bits modulo 2 (referred to as add-modulo-2), e.g. realized by an XOR or an XNOR.

In other words, according to one embodiment, the inputs of each OR of an OR-tree based zero detection circuit as well as its output are masked and the zero detection output is calculated based on a masked logic, e.g. as illustrated in FIG. 3. The masks may at least be partially independent from each other or may be partially the same. For example, two or more data inputs may use the same input masks. However, to increase security, the data inputs may use independent masks. Accordingly, independent masking bit inputs may be provided which are supplied by masking bits, e.g. from a (secure) random number generator.

"Masked" with m means a one-time-pad (OTP) XOR operation of the plain text bit XOR(p, m) so that the cipher text bit c is given by c=XOR(p, m).

In the following, various embodiments are indicated.

Embodiment 1 is a zero detection circuit as illustrated in FIG. 2.

Embodiment 2 is a zero detection circuit of embodiment 1, wherein each data input bit is associated with an input masking bit of the one or more input masking bits.

Embodiment 3 is a zero detection circuit of embodiment 2, wherein each masked OR circuit is configured to output a bit equal to an OR combination, masked with the output masking bit, of the data input bits, each demasked with the input masking bit associated with the data input bit.

Embodiment 4 is a zero detection circuit of any one of embodiments 1 to 3, wherein each data input is associated with an input mask input and, for each data input, the data input bit input via the data input is associated with the input masking bit input via the input mask input associated with the data input.

Embodiment 5 is a zero detection circuit of embodiment 4, wherein the output mask input of the masked OR circuit preceding the masked OR circuit is configured to receive the same masking bit as the input mask input associated with the data input of the masked OR circuit coupled to the data output of the masked OR circuit preceding the masked OR circuit in the chain of masked OR circuits.

Embodiment 6 is a zero detection circuit of embodiment 4 or 5, wherein at least two data inputs of the masked OR circuit are associated with different input mask inputs.

Embodiment 7 is a zero detection circuit of any one of embodiments 4 to 6, wherein at least two data inputs are associated with the same input mask input.

Embodiment 8 is a zero detection circuit of any one of embodiments 1 to 7, wherein the data output of the last masked OR circuit of the chain of masked OR circuits forms an output of the zero detector for outputting a zero detection result.

Embodiment 9 is a zero detection circuit of any one of embodiments 1 to 8, wherein the zero detection circuit includes one or more further chains of masked OR circuits, wherein the chain of masked OR circuits and the one or more further chains of masked OR circuits generate zero detection results for data input bits supplied to the chain of masked OR circuits and the one or more further chains masked OR circuits and further including a further masked OR circuit configured to receive the zero detection results and generated an output representing an OR combination of the zero detection results.

Embodiment 10 is a masked OR circuit as illustrated in FIG. 3.

Embodiment 11 is a masked OR circuit of embodiment 10, wherein the first adder-modulo-2 is an XOR.

Embodiment 12 is a masked OR circuit of embodiment 10 or 11, wherein the second adder-modulo-2 is an XNOR configured to add-modulo-2 the result of the first adder-modulo-2 to the first data input bit and invert it.

Embodiment 13 is a masked OR circuit of any one of embodiments 10 to 12, wherein the combiner includes a masked NAND configured to output a NAND combination, masked with the output masking bit, of the inverted result of the second adder-modulo-2 and the inverted one or more further bits.

Embodiment 14 is a masked OR circuit of any one of embodiments 10 to 13, further including a second input mask input configured to receive a second input masking bit, a third adder-modulo-2 configured to add-modulo-2 the second input masking bit and the output masking bit, a fourth adder-modulo-2 configured to add-modulo-2 the result of the third adder-modulo-2 to one of the one or more second data input bits, wherein the result of the fourth adder-modulo-2 is one of the one or more further bits.

Embodiment 15 is a masked OR circuit of embodiment 14, wherein the third adder-modulo-2 is an XOR.

Embodiment 16 is a masked OR circuit of embodiment 14 or 15, wherein the fourth adder-modulo-2 is an XNOR configured to add-modulo-2 the result of the third adder-modulo-2 to the one of the one or more second data input bits and invert it.

Embodiment 17 is a masked OR circuit of embodiment any one of embodiments 14 to 16, further including a third input mask input configured to receive a third input masking bit, a fifth adder-modulo-2 configured to add-modulo-2 the third input masking bit and the output masking bit, a sixth adder-modulo-2 configured to add-modulo-2 the result of the fifth adder-modulo-2 to another one of the one or more second data input bits, wherein the result of the sixth adder-modulo-2 is another one of the one or more further bits.

Embodiment 18 is a masked OR circuit of embodiment 17, wherein the fifth adder-modulo-2 is an XOR.

Embodiment 19 is a masked OR circuit of embodiment 17 or 18, wherein the sixth adder-modulo-2 is an XNOR configured to add-modulo-2 the result of the fifth adder-modulo-2 to the other one of the one or more second data input bits and invert it.

In the following, embodiments are described in more detail.

Figure 4:
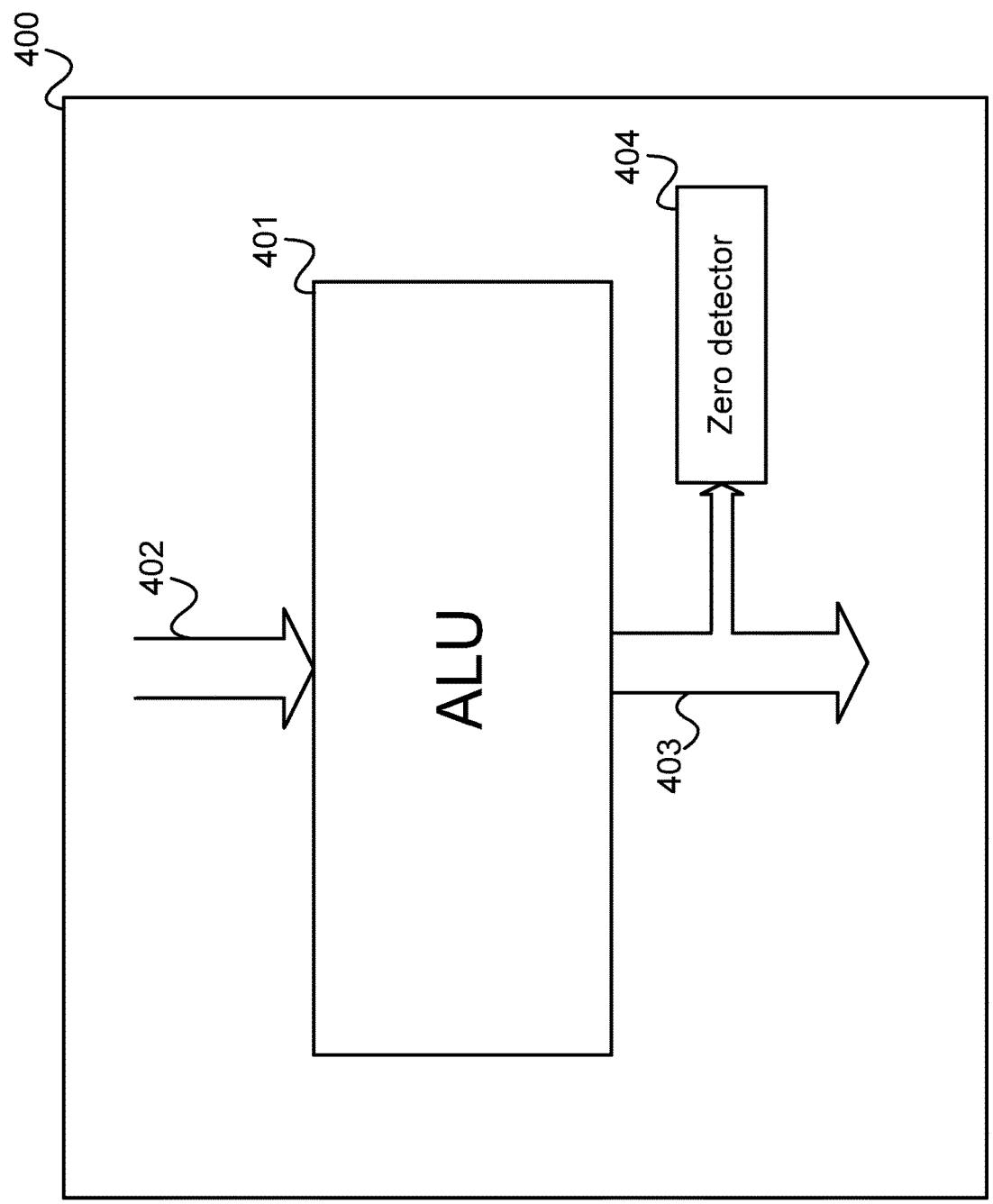
FIG. 4 shows a data processing arrangement.

FIG. 4 shows a data processing arrangement 400.

The data processing arrangement 400 includes an ALU 401 which receives an input via an input bus 402. The ALU 401 processes the input, e.g. adds two binary numbers, and outputs the result of the processing via an output bus 403. In this example, a zero detector 404 is coupled to the output bus which detects whether all bits of the output are zero.

The data processing arrangement 400 is for example part of a processor (e.g. a CPU) which may itself be part of a security critical device, e.g. of a chip card module of a chip card.

For a security critical device the ALU 401 may be masked to prevent against probing or forcing attacks. This means that also the output of the ALU 401 is masked. To calculate the zero detection result different possibilities exist to use the masked result values, i.e. the masked ALU output. A straight forward approach is to generate the plain (unmasked) values and calculate the zero detection value on these plain values. In this case, however, it must be ensured that the plain values are protected against probing/forcing, e.g. by usage of shielding techniques.

In contrast, according to an embodiment, the inputs to the zero detection circuit are masked. Additionally, the zero detection output is calculated based on a masked logic.

Figure 5:
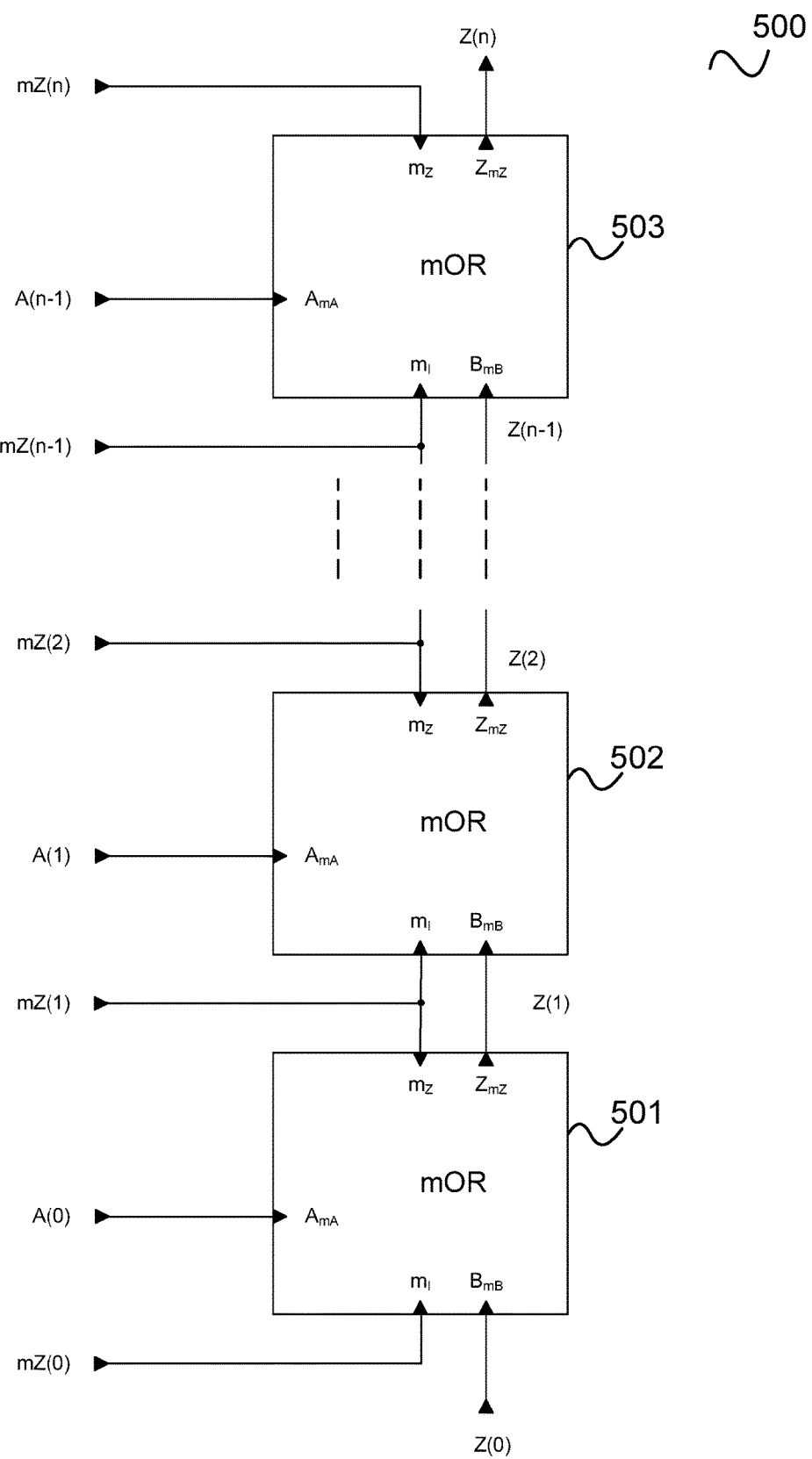
FIG. 5 shows a zero detection circuit based on a masked OR tree logic.

FIG. 5 shows a zero detection circuit 500 based on a masked OR tree logic.

The zero detection circuit includes a chain of n masked OR (mOR) circuits 501, 502, 503, numbered from 0 to n−1, wherein each mOR circuit 501, 502, 503 includes two masked (data) inputs $A_{mA}$ and $B_{mB}$ and a masked output $Z_{mZ}$.

The zero detection circuit 500 identifies a zero value on a masked output A<n−1:0> on an output bus, e.g. corresponding to the output bus 403, i.e. detects whether, when unmasked, all bits of the n-bit word A(0) . . . A(n−1) on the output bus are equal to zero.

For this, the ith OR circuit receives the bit A(i) at its $A_{mA}$ input, the output of the previous mOR circuit Z(i) at its $B_{mZ}$ input except for the first OR circuit 101 which receives a value Z(0) at its B input. The value Z(0) may be set to mZ(0) but may also be the masked result of a preceding zero detection circuit for forwarding the result of the preceding zero detection circuit (and possibly overwriting the zero detection of the zero detection circuit 500).

In this example, a single mask is used on each slice (i.e. bit) A(i) of the output A(0) . . . A(n−1). This means that the inputs of each mOR A(i) and Z(i) are both masked with the same mask mZ(i) (i=0, . . . , n−1). For this, the ith mOR has an input mask input $m_I$ for receiving the input mask mZ(i) as well as an output mask input mz for receiving the output mask mZ(i+1).

The ith mOR generates the output bit Z(i+1) which is equal to the OR combination, masked with mZ(i+1) of A(i) demasked with mZ(i) and Z(i) demasked with mZ(i).

The output of the n-1th OR circuit 503 Z(n) is the output of the zero detection circuit 500. A value of Z(n), demasked with mZ(n), indicates whether all bits of A(0) . . . A(n−1), demasked with mZ(0) . . . mZ(n−1) are equal to zero.

The usage of the same mask mZ(i) for both inputs A(i) and Z(i) requires low additional effort inside the a masked OR gate (mOR) with respect to a regular (unmasked) OR gate.

Figure 6:
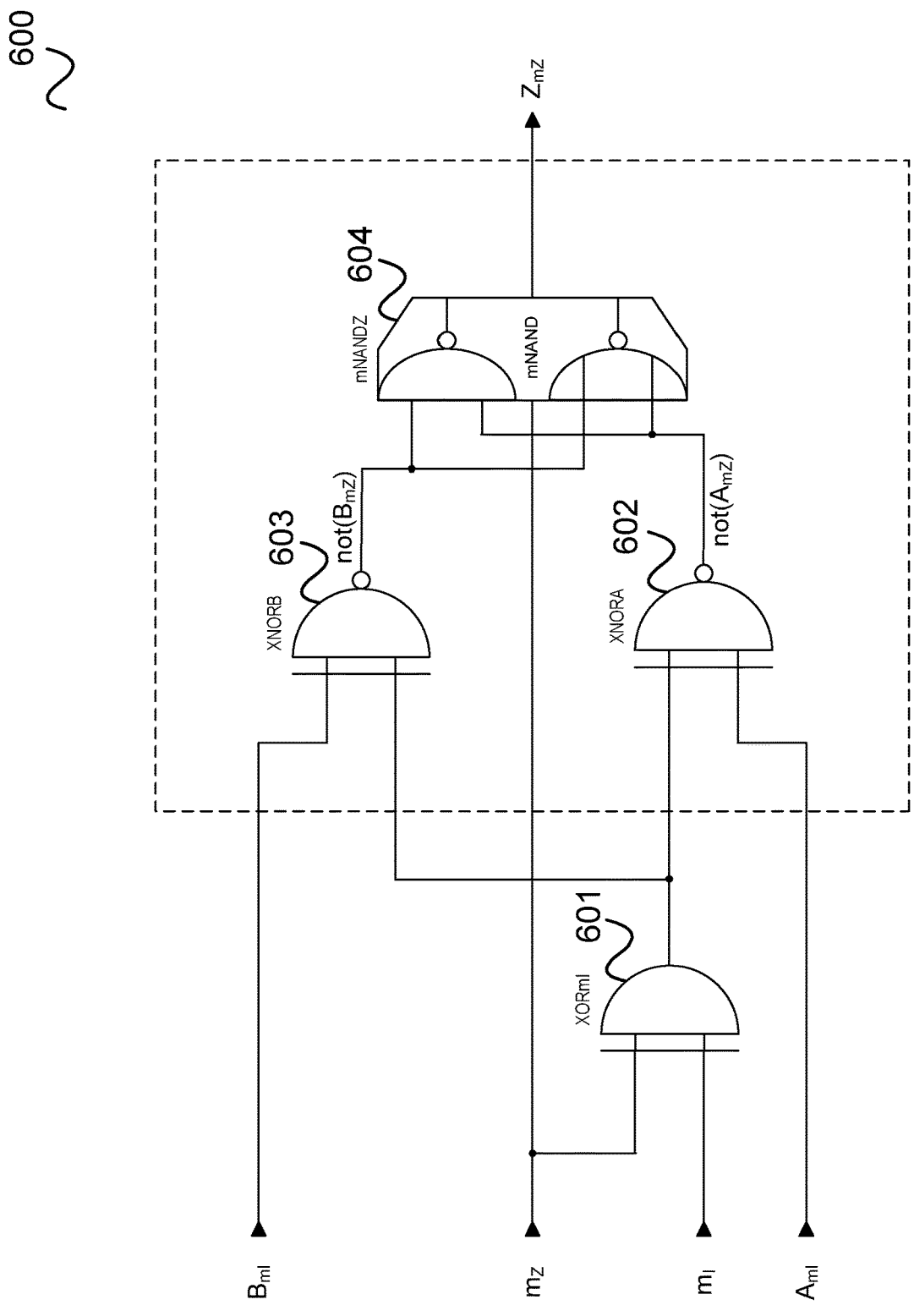
FIG. 6 shows a masked OR circuit for one mask for both inputs and one mask for the output according to an embodiment.

For example, the masked ORs 501, 502, 503 have a structure as illustrated in FIG. 6.

FIG. 6 shows a masked OR circuit 600 for one mask for both inputs and one mask for the output according to an embodiment.

The masked OR circuit 600 receives an input masking bit $m_I$, an output masking bit $m_Z$, a first data input bit $A_{mI}$ (A masked with $m_I$) and a second data input bit $B_{MI}$ (B masked with $m_I$) as inputs.

The masked OR circuit 600 includes an XOR (i.e. an XOR gate) 601 which XORs (i.e. does an XOR combination of) $m_I$ and $m_Z$. It further includes a first XNOR 602 and a second XNOR 603 wherein the first XNOR (i.e. an XNOR gate) 602 XNORs (i.e. does an XNOR combination of) $B_{mI}$ and the result of the XOR 601 and the second XNOR 603 XNORs $A_{mI}$ and the result of the XOR 601. The result of the first XNOR 602 is the complement of B masked with mZ (i.e. not($B_{mZ}$)). The result of the second XNOR 603 is the complement of A masked with mZ (i.e. not($A_{mZ}$)). The results of the XNORs 602, 603 are supplied, along with the output mask $m_Z$, to a masked NAND (mNAND) 604, for example as illustrated in FIG. 7.

Figure 7:
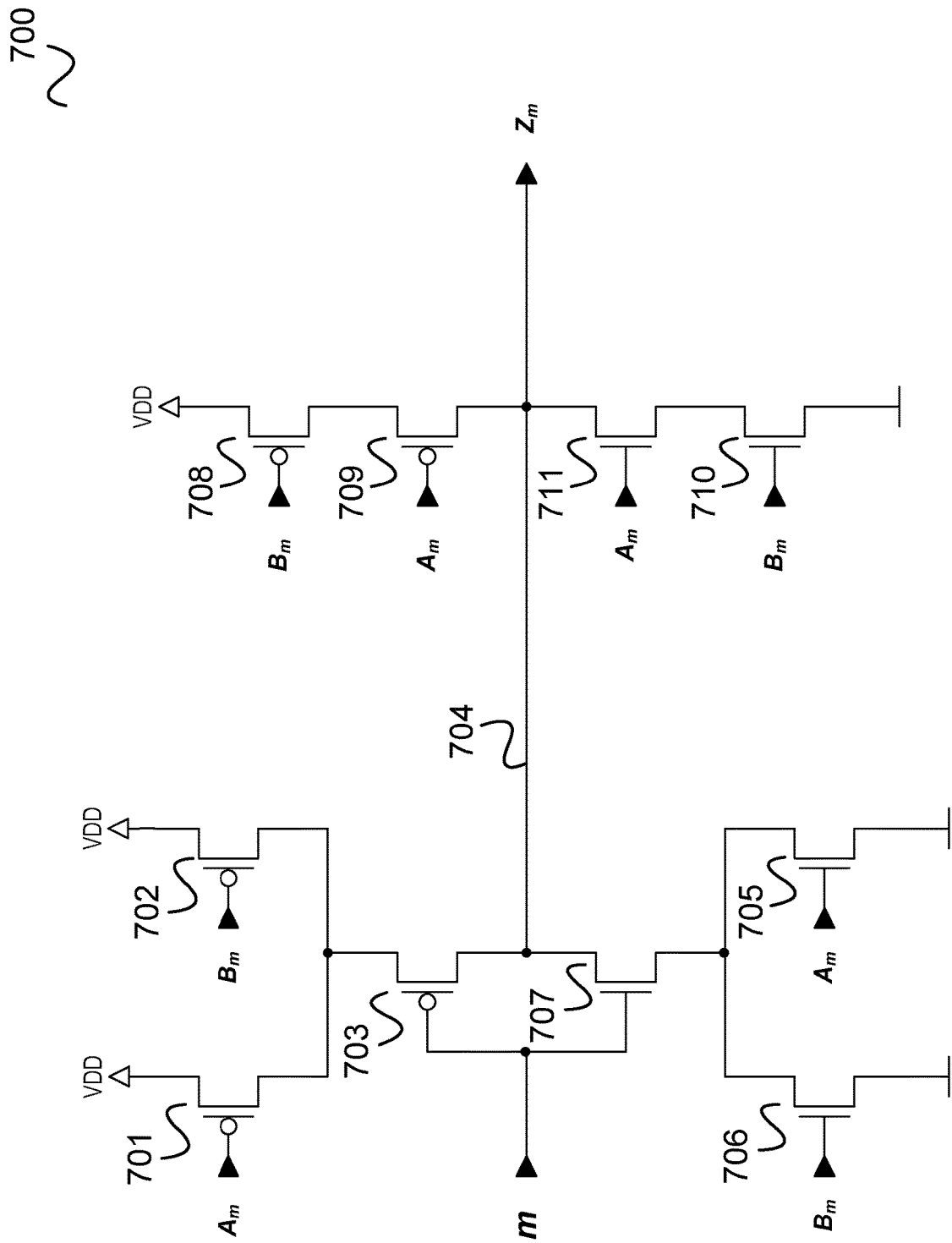
FIG. 7 shows a masked NAND circuit.

FIG. 7 shows a masked NAND (mNAND) circuit 700.

The mNAND circuit 700 receives a data input $A_m$ (A masked with m), a data input $B_m$ (B masked with m) and a mask m (used for both data inputs).

When used as mNAND 604 in the mOR circuit 600, not($A_{mZ}$) is supplied as $A_m$, not($B_{mZ}$) is supplied as $B_m$ and $m_Z$ is supplied as m to the mNAND circuit 700.

The mNAND circuit 700 includes a first p channel FET 701 whose source is connected to the high supply potential (VDD) and whose gate is supplied with the input signal $A_m$ and includes a second p channel FET 702 whose source is connected to the high supply potential and whose gate is supplied with the input signal $B_m$. The drains of the first p channel FET 701 and the second p channel FET 702 are connected to the source of a third p channel FET 703 whose gate is supplied with the input signal m and whose drain is connected to an output node 704 whose state is the output $Z_m$.

The mNAND circuit 700 further includes a first n channel FET 705 whose source is connected to the low supply potential (VSS) and whose gate is supplied with the input signal $A_m$ and includes a second n channel FET 706 whose source is connected to the low supply potential and whose gate is supplied with the input signal $B_m$. The drains of the first n channel FET 705 and the second n channel FET 706 are connected to the source of a third n channel FET 707 whose gate is supplied with the input signal m and whose drain is connected to the output node 704.

The mNAND circuit 700 further includes a fourth p channel FET 708 whose source is connected to the high supply potential and whose gate is supplied with the input signal $B_m$ and whose drain is connected to the source of a fifth p channel FET 709 whose gate is supplied with the input signal $A_m$ and whose drain is connected to the output node 704.

The mNAND circuit 700 further includes a fourth n channel FET 710 whose source is connected to the low supply potential and whose gate is supplied with the input signal $B_m$ and whose drain is connected to the source of a fifth n channel FET 711 whose gate is supplied with the input signal $A_m$ and whose drain is connected to the output node 704.

Field effect transistors included in embodiments may for example be MOS (metal oxide semiconductor) transistors, for example manufactured in CMOS (Complementary MOS) technology.

It can be seen that according to the masked OR circuit 600 the inputs which are masked with the input mask $m_I$ are first remasked to the output mask $m_Z$ and then inside the masked NAND 604 the logical OR functionality is implemented. It should be noted that none of the internal nodes of the masked OR gate 600 carries plain information at any time. The output of the masked OR gate 600 generates a masked zero generation information. This output becomes directly the input of the next bitslice, i.e. the subsequent mOR in the chain of mORs (unless it is the last in the chain). As illustrated in FIG. 5, the output mask mz corresponds to the input mask $m_I$ of the subsequent mOR in the chain.

For higher protection levels the information can be split into more shares by masking each input is with different masks since this increases the effort for an attacker.

Figure 8:
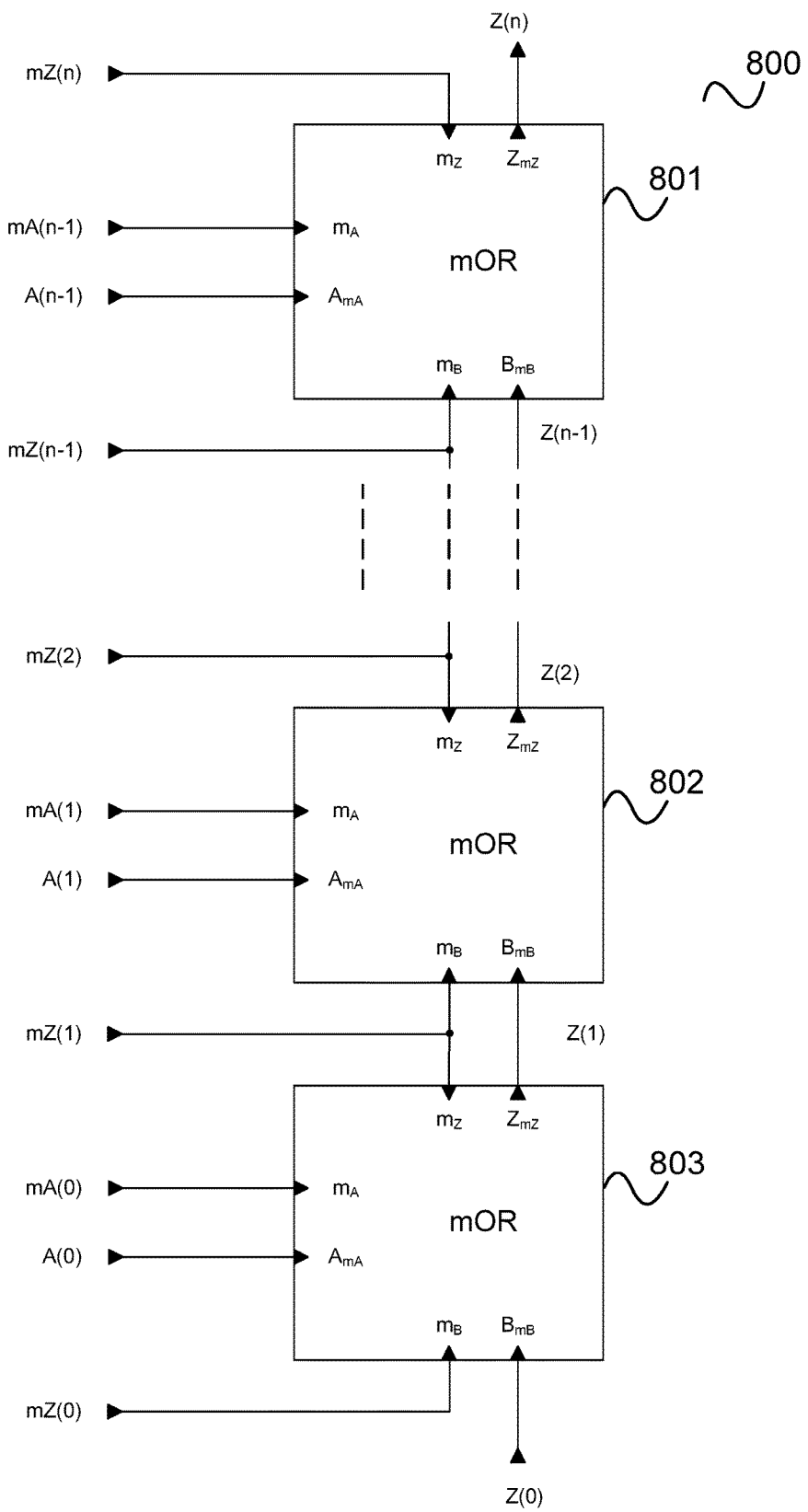
FIG. 8 shows a zero detection circuit based on a masked OR tree logic with independent masks for the data inputs of each masked.

FIG. 8 shows a zero detection circuit 800 based on a masked OR tree logic with independent masks for the data inputs of each mOR.

The zero detection circuit includes a chain of n masked OR (mOR) circuits 801, 802, 803, numbered from 0 to n−1, wherein each mOR circuit 801, 802, 803 includes two masked (data) inputs $A_{mA}$ and $B_{mB}$ and a masked output $Z_{mZ}$.

The zero detection circuit 800 identifies a zero value on a masked output A<n−1:0> on an output bus, e.g. corresponding to the output bus 403, i.e. detects whether, when unmasked, all bits of the n-bit word A(0) . . . A(n−1) on the output bus are equal to zero.

For this, the ith OR circuit receives the bit A(i) at its $A_{mA}$ input and the output of the previous mOR circuit Z(i) at its $B_{mZ}$ input except for the first OR circuit 101 which receives a value Z(0) at its B input. The value Z(0) may be set to mZ(0) but may also be the masked result of a preceding zero detection circuit for forwarding the result of the preceding zero detection circuit (and possibly overwriting the zero detection of the zero detection circuit 800).

In this example, different masks are used for the two inputs. This means that the inputs of the ith mOR A(i) and Z(i) are masked with the different masks, namely with $m_A$(i) and $m_Z$(i), respectively. For this, the ith mOR has a first input mask input $m_A$ for receiving the first input mask mA(i), a second input mask for receiving the second input mask $m_Z$(i) as well as an output mask input mz for receiving the output mask $m_Z$(i+1).

The ith mOR generates the output bit Z(i+1) which is equal to the OR combination, masked with mZ(i+1), of A(i) demasked with mA(i) and Z(i) demasked with mZ(i).

The output of the n−1th OR circuit 803 Z(n) is the output of the zero detection circuit 800. A value of Z(n), demasked with mZ(n), indicates whether all bits of A(0) . . . A(n−1), demasked with $m_A$(0) . . . $m_A$(n−1), are equal to zero.

In other words, in the zero detection circuit 800, the A input and the B input of each mOR use different masks. These masks are used internally inside the mOR gate which is for example implemented as illustrated in FIG. 9.

Figure 9:
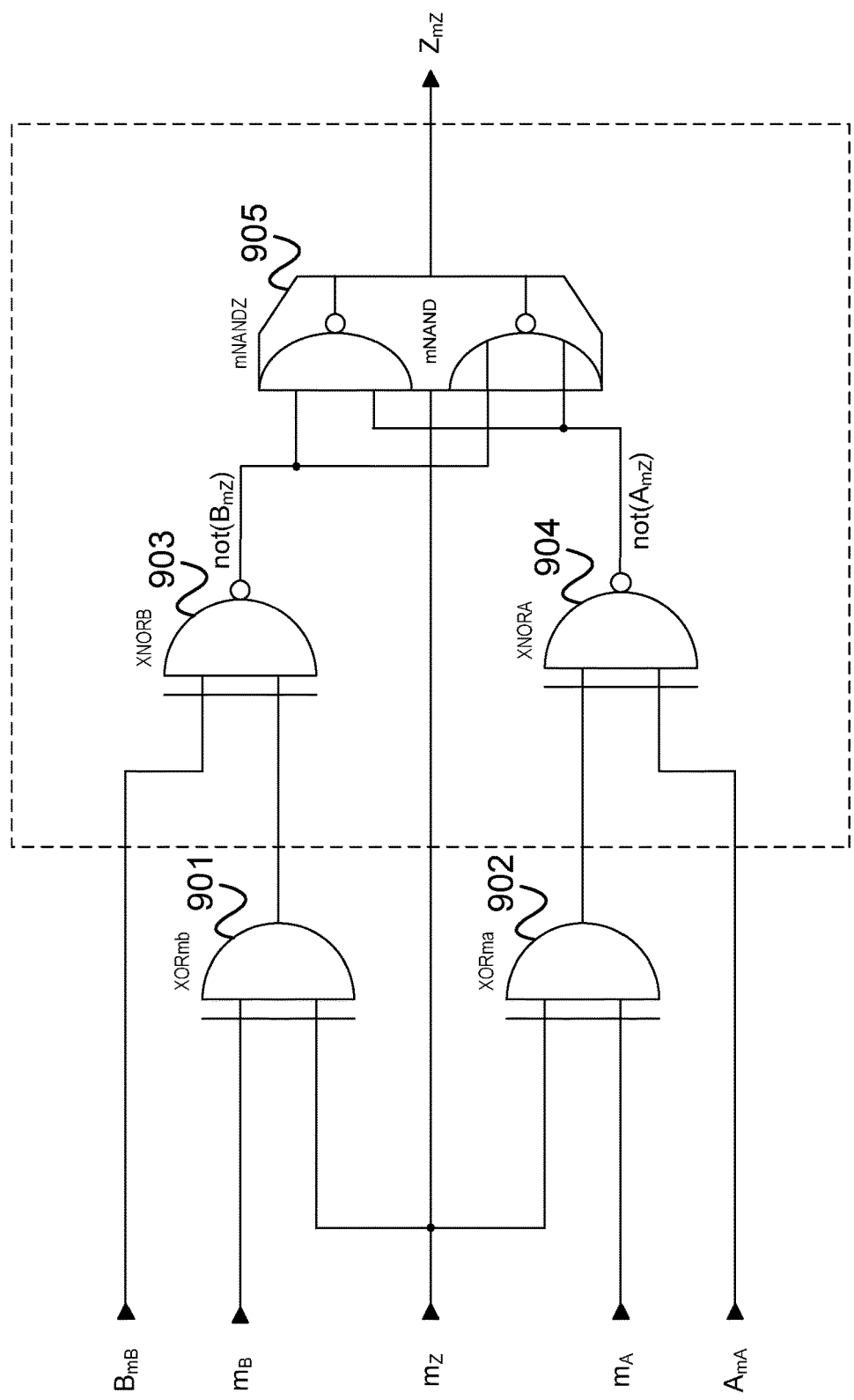
FIG. 9 shows a masked OR circuit for different masks for both inputs and one mask for the output according to an embodiment.

FIG. 9 shows a masked OR circuit 900 for different masks for both inputs and one mask for the output according to an embodiment.

The masked OR circuit 900 receives a first input masking bit $m_A$, a second input masking bit $m_B$, an output masking bit $m_Z$, a first data input bit $A_{mA}$ (A masked with $m_A$) and a second data input bit $B_{mB}$ (B masked with $m_B$) as inputs.

The masked OR circuit 900 includes a first XOR 901 which XORs (i.e. does an XOR combination of) $m_B$ and $m_Z$ and a second XOR 902 which XORs $m_A$ and $m_Z$. It further includes a first XNOR 903 and a second XNOR 904 wherein the first XNOR 903 XNORs (i.e. does an XNOR combination of) $B_{mB}$ and the result of the first XOR 901 and the second XNOR 904 XNORs $A_{mA}$ and the result of the second XOR 902. The result of the first XNOR 903 is the complement of B masked with mz (i.e. not($B_{mZ}$)). The result of the second XNOR 904 is the complement of A masked with $m_Z$ (i.e. not($A_{mZ}$)). The results of the XNORs 903, 904 are supplied, along with the output mask $m_Z$, to a masked NAND (mNAND) 905, for example as illustrated in FIG. 7.

With the approach of FIG. 8 and FIG. 9 long wires, where an attacker can try to probe or force information in an electronic circuit, can be avoided. Additional masks can be used to increase the number of shares and therefore the effort needed to probe plain information. This means that each input is masked with the sum of a plurality, e.g. m, masks. Additionally all m masks become also input of the masked OR gate. Again, a remasking of the inputs to a sum of output masks (corresponding to the sum of input masks of the subsequent mOR gate in the chain) can be realized.

According to one embodiment, a zero detection circuit includes mOR gates arranged in a tree including a plurality of sub-chains.

Figure 10:
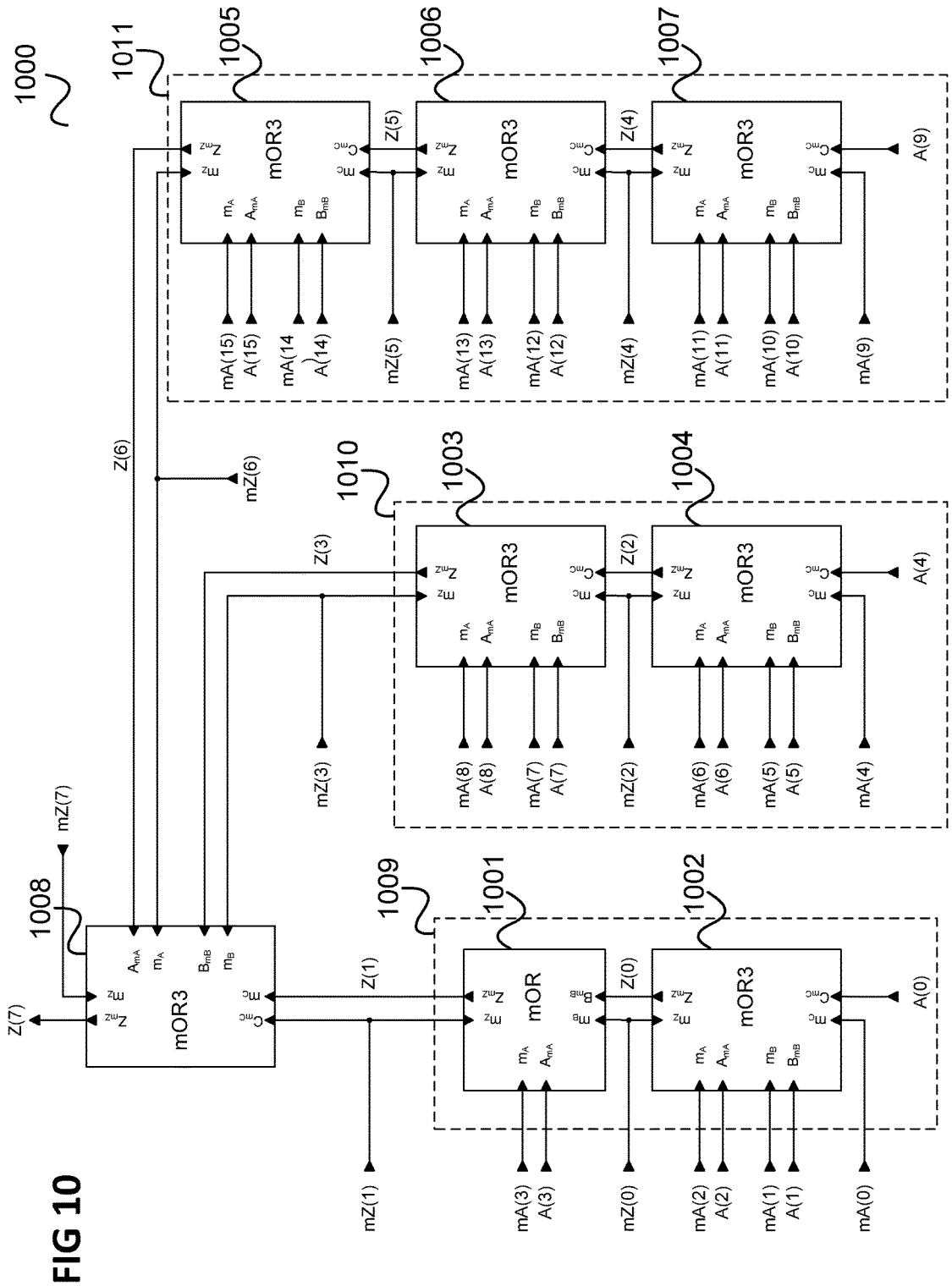
FIG. 10 shows a zero detection circuit including a plurality of zero detection sub-chains.

FIG. 10 shows a zero detection circuit 1000 including a plurality of zero detection sub-chains.

The zero detection circuit 1000 includes a plurality of mORs 1001 to 1008, wherein, in this example, only a first mOR 1001 is a two-input mOR like the mORs of the zero detection circuit 800 while the second to eighth mORs 1002 to 1008 are three input mORs, i.e. mOR3s which have three data inputs $A_{mA}$, $B_{mB}$, $C_{mC}$, respective masking inputs $m_A$, $m_B$, $m_C$ for each data input, an output $Z_{mZ}$ and an output mask input $m_Z$.

The first mOR 1001 and the second mOR 1002 form a first sub-chain 1009, the third mOR 1003 and the fourth mOR 1004 form a second sub-chain 1010 and the fifth to seventh mORs 1005 to 1007 form a third sub-chain 1011.

The first sub-chain 1009 generates a (masked) output signal Z(1) representing the zero detection result for A(0) to A(3), the second sub-chain 1010 generates a (masked) output signal Z(6) representing the zero detection result for A(4) to A(8) and the third sub-chain 1011 generates a (masked) output signal Z(3) representing the zero detection result for A(9) to A(15). The eighth mOR 1008 gathers, via its three data inputs, the detection results of the three sub-chains Z(1), Z(3) and Z(6) and outputs the overall (masked) zero detection result Z(7) representing the zero detection result for A(0) to A(15) which is for example the masked output of ALU 401 on the ALU output bus 401.

Figure 11:
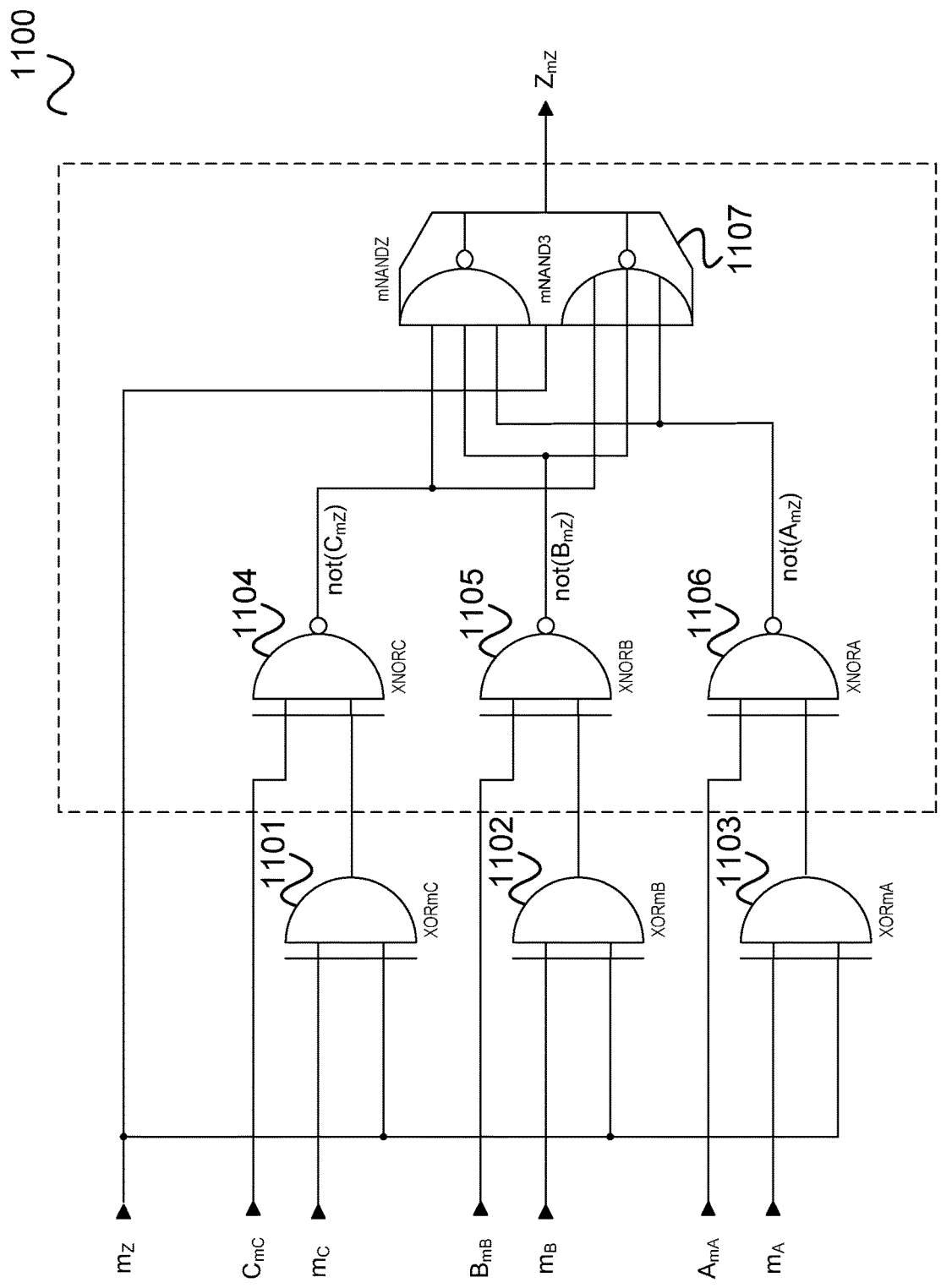
FIG. 11 shows a masked OR circuit for different masks for both inputs and one mask for the output according to an embodiment.

The mOR3s can for example be implemented as illustrated in FIG. 11.

FIG. 11 shows a masked OR circuit 1100 for different masks for both inputs and one mask for the output according to an embodiment.

The masked OR circuit 1100 receives a first input masking bit $m_A$, a second input masking bit $m_B$, a third input masking bit $m_C$, an output masking bit $m_Z$, a first data input bit $A_{mA}$ (A masked with $m_A$), a second data input bit $B_{mB}$ (B masked with $m_B$) and a third data input bit $C_{mC}$ (C masked with $m_C$) as inputs.

The masked OR circuit 1100 includes a first XOR 1101 which XORs (i.e. does an XOR combination of) $m_C$ and $m_Z$ a second XOR 1102 which XORs $m_B$ and $m_Z$ and a third XOR 1103 which XORs $m_A$ and $m_Z$. It further includes a first XNOR 1104, a second XNOR 1105 and a third XNOR 1106 wherein the first XNOR 1104 XNORs (i.e. does an XNOR combination of) $C_{mC}$ and the result of the first XOR 1101, the second XNOR 1105 XNORs $B_{mB}$ and the result of the second XOR 1102 and the third XNOR 1106 XNORs $A_{mA}$ and the result of the third XOR 1103.

The result of the first XNOR 1104 is the complement of C masked with $m_Z$ (i.e. not($C_{mZ}$)). The result of the second XNOR 1105 is the complement of B masked with mZ (i.e. not($B_{mZ}$)). The result of the third XNOR 1106 is the complement of A masked with mZ (i.e. not($A_{mZ}$)). The results of the XNORs 1104, 1105, 1106 are supplied, along with the output mask $m_Z$, to a masked NAND (mNAND3) 1107, for example as illustrated in FIG. 12.

Figure 12:
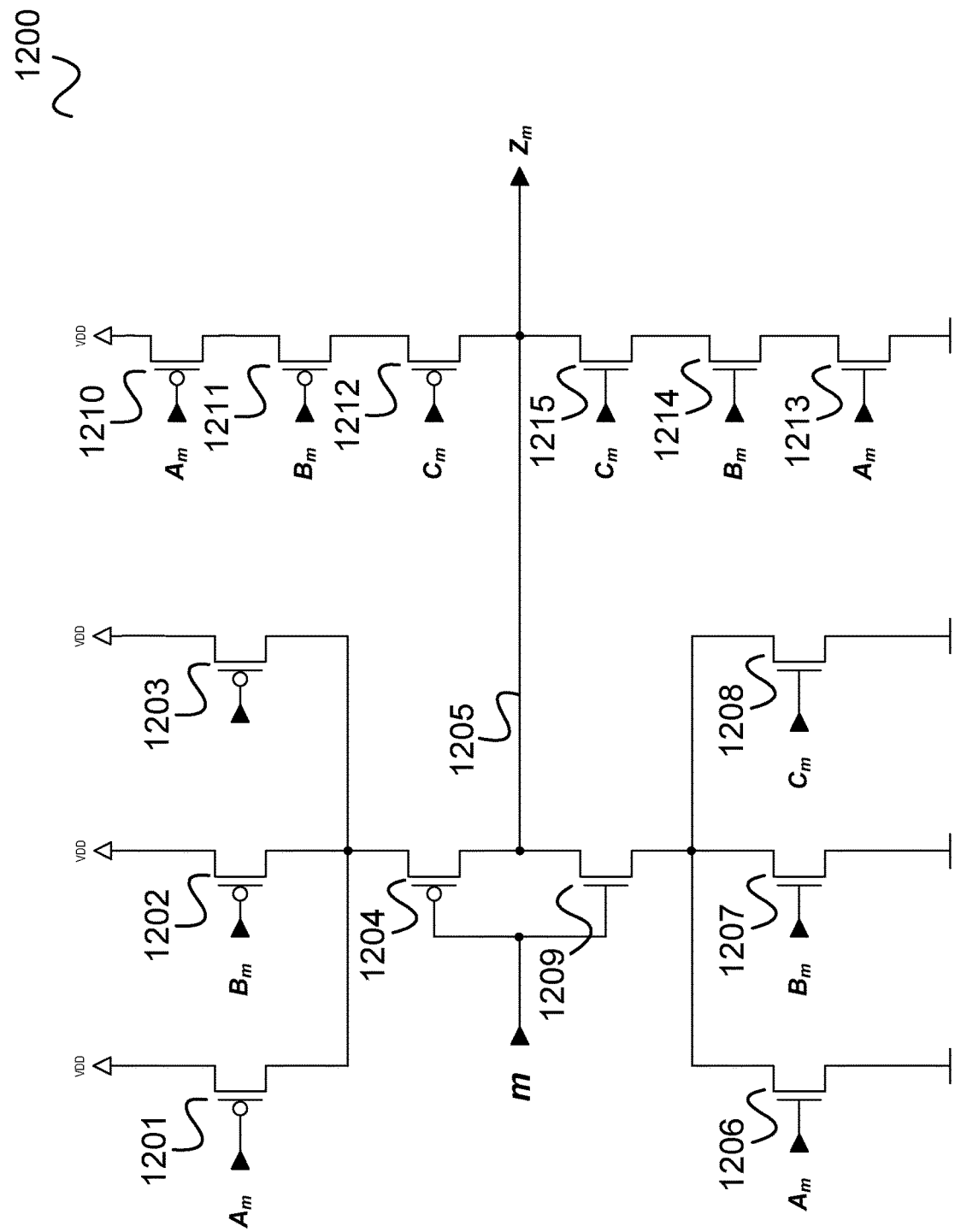
FIG. 12 shows a masked NAND circuit.

FIG. 12 shows a masked NAND (mNAND) circuit 1200.

The mNAND circuit 1200 receives a data input $A_m$ (A masked with m), a data input $B_m$ (B masked with m), a data input $C_m$ (C masked with m) and a mask m (used for all three data inputs).

When used as mNAND 1107 in the mOR3 circuit 1100, not($A_{mZ}$) is supplied as $A_m$, not($B_{mZ}$) is supplied as $B_m$, not($C_{mZ}$) is supplied as $C_m$ and $m_Z$ is supplied as m to the mNAND circuit 1200.

The mNAND circuit 1200 includes a first p channel FET 1201 whose source is connected to the high supply potential (VDD) and whose gate is supplied with the input signal $A_m$, includes a second p channel FET 1202 whose source is connected to the high supply potential and whose gate is supplied with the input signal $B_m$ and includes a third p channel FET 1203 whose source is connected to the high supply potential and whose gate is supplied with the input signal $C_m$. The drains of the first p channel FET 1201, the second p channel FET 1202 and the third p channel FET 1203 are connected to the source of a fourth p channel FET 1204 whose gate is supplied with the input signal m and whose drain is connected to an output node 1205 whose state is the output $Z_m$.

The mNAND circuit 1200 further includes a first n channel FET 1206 whose source is connected to the low supply potential (VSS) and whose gate is supplied with the input signal $A_m$, a second n channel FET 1207 whose source is connected to the low supply potential and whose gate is supplied with the input signal $B_m$ and a third n channel FET 1208 whose source is connected to the low supply potential and whose gate is supplied with the input signal $C_m$. The drains of the first n channel FET 1206, the second n channel FET 1207 and the third n channel FET 1208 are connected to the source of a fourth n channel FET 1209 whose gate is supplied with the input signal m and whose drain is connected to the output node 1205.

The mNAND circuit 1200 further includes a fifth p channel FET 1210 whose source is connected to the high supply potential and whose gate is supplied with the input signal $A_m$ and whose drain is connected to the source of a sixth p channel FET 1211 whose gate is supplied with the input signal $B_m$ and whose drain is connected to the source of a seventh p channel FET 1212 whose gate is supplied with the input signal $C_m$ and whose drain is connected to the output node 1205.

The mNAND circuit 1200 further includes a fifth n channel FET 1213 whose source is connected to the low supply potential and whose gate is supplied with the input signal $A_m$ and whose drain is connected to the source of a sixth n channel FET 1214 whose gate is supplied with the input signal $B_m$ and whose drain is connected to the source of a seventh n channel FET 1215 whose gate is supplied with the input signal $C_m$ and whose drain is connected to the output node 1205.

According to one embodiment, a zero detection circuit is provided including a chain of masked OR circuits, wherein each masked OR circuit of the chain of masked OR circuits includes a plurality of data inputs, wherein each data input is configured to receive a respective data input bit, at least one input mask input configured to receive one or more input masking bits, at least one output mask input configured to receive an output masking bit and a data output and is configured to output a bit equal to an OR combination, masked with the output masking bit, of the data input bits, each demasked with an input masking bit of the one or more input masking bits, and wherein one of the inputs of each masked OR circuit except the first masked OR circuit of the chain of masked OR circuits is coupled to the data output of the masked OR circuit preceding the masked OR circuit in the chain of masked OR circuits.

According to another embodiment, a masked OR circuit is provided including a first data input configured to receive a first data input bit, one or more second data inputs configured to receive one or more second data input bits, an input mask input configured to receive an input masking bit, an output mask input configured to receive an output masking bit, a first adder-modulo-2 configured to add-modulo-2 the input masking bit and the output masking bit, a second adder-modulo-2 configured to add-modulo-2 the result of the first adder-modulo-2 to the first data input bit and a combiner, configured to receive the result of the second adder-modulo-2 and one or more further bits depending on the one or more second data input bits and is configured to generate an output equal to an OR combination, masked with the output masking bit, of the result of the second adder-modulo-2, demasked with the output masking bit, and the one or more further bits, demasked with the output masking bit.

While specific aspects have been described, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A zero detection circuit, comprising
a chain of masked OR circuits, wherein
each masked OR circuit of the chain of masked OR circuits comprises
   a plurality of data inputs, wherein each data input is configured to receive
   a respective data input bit,
   at least one input mask input configured to receive one or more input masking bits,
   at least one output mask input configured to receive an output masking bit and
   a data output
and is configured to output a bit equal to an OR combination, masked with the output masking bit, of the data input bits, each demasked with an input masking bit of the one or more input masking bits, and
wherein one of the inputs of each masked OR circuit except the first masked OR circuit of the chain of masked OR circuits is coupled to the data output of the masked OR circuit preceding the masked OR circuit in the chain of masked OR circuits, and
wherein the data output of the last masked OR circuit of the chain of masked OR circuits forms an output of the zero detection circuit for outputting a zero detection result.

2. The zero detection circuit of claim 1,
wherein each data input bit is associated with an input masking bit of the one or more input masking bits.

3. The zero detection circuit of claim 2,
wherein each masked OR circuit is configured to output a bit equal to an OR combination, masked with the output masking bit, of the data input bits, each demasked with the input masking bit associated with the data input bit.

4. The zero detection circuit of claim 1,
wherein each data input is associated with an input mask input and, for each data input, the data input bit which is input via the data input is associated with the input masking bit input via the input mask input associated with the data input.

5. The zero detection circuit of claim 4,
wherein the output mask input of the masked OR circuit preceding the masked OR circuit is configured to receive the same masking bit as the input mask input associated with the data input of the masked OR circuit coupled to the data output of the masked OR circuit preceding the masked OR circuit in the chain of masked OR circuits.

6. The zero detection circuit of claim 4,
wherein at least two data inputs of the masked OR circuit are associated with different input mask inputs.

7. The zero detection circuit of claim 4,
wherein at least two data inputs are associated with the same input mask input.

8. The zero detection circuit of claim 1,
wherein the zero detection circuit comprises one or more further chains of masked OR circuits, wherein the chain of masked OR circuits and the one or more further chains masked OR circuits generate zero detection results for data input bits supplied to the chain of masked OR circuits and the one or more further chains of masked OR circuits and further comprising a further masked OR circuit configured to receive the zero detection results and generates an output representing an OR combination of the zero detection results.

* * * * *